No. 686,416. Patented Nov. 12, 1901.
W. M. MORDEY.
ALTERNATE CURRENT TRANSMISSION.
(Application filed Mar. 16, 1900.)
(No Model.) 2 Sheets—Sheet 1.
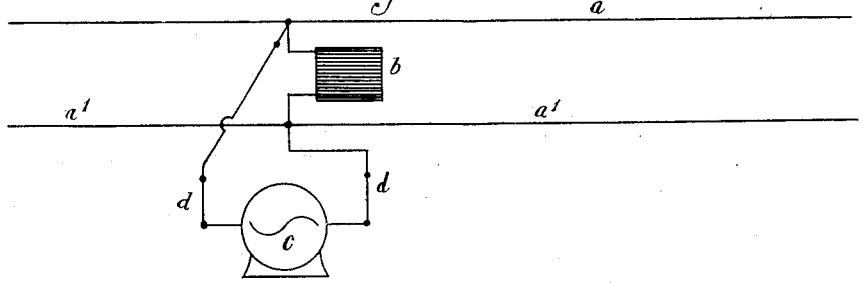
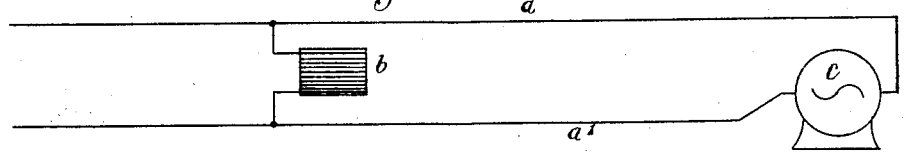
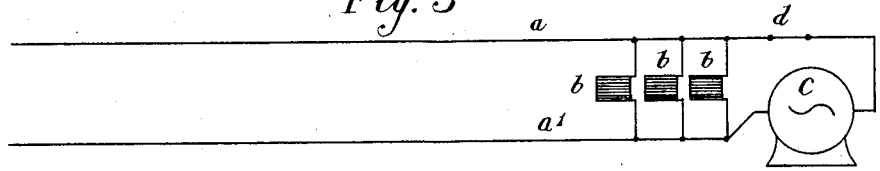
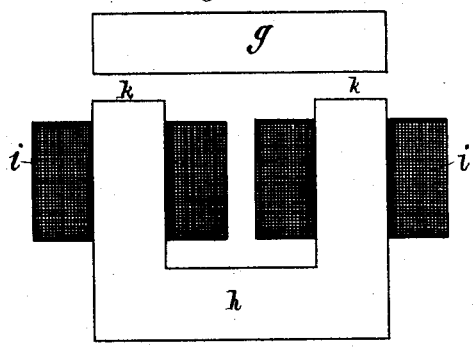
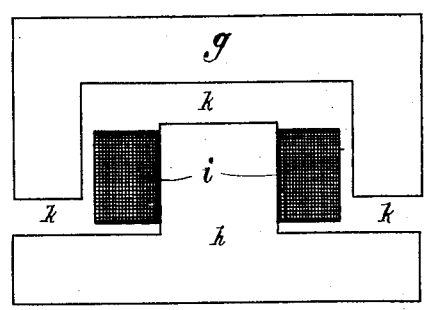
Witnesses:
C. Holloway
W. C. Pinckney
Inventor:
William M. Mordey
By Edmond Congar Brown,
Attorney.

No. 686,416. Patented Nov. 12, 1901.
W. M. MORDEY.
ALTERNATE CURRENT TRANSMISSION.
(Application filed Mar. 16, 1900.)
(No Model.) 2 Sheets—Sheet 2.
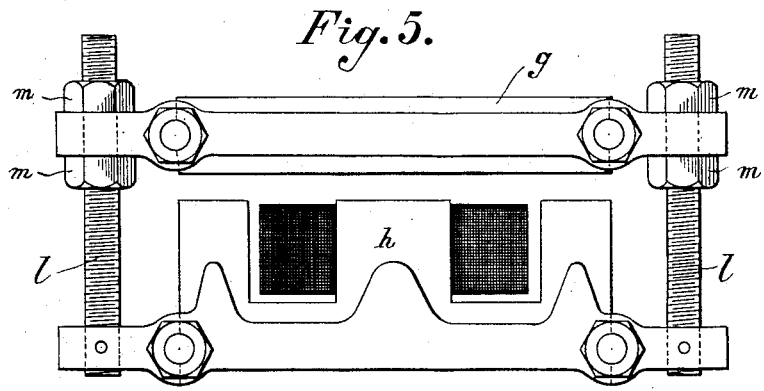
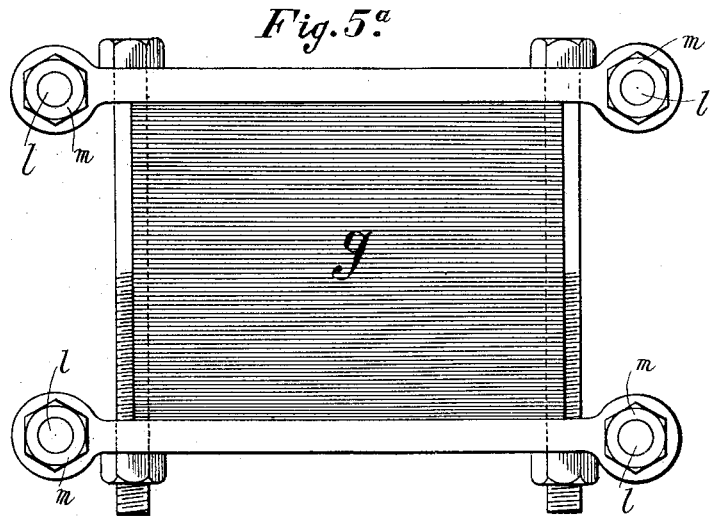
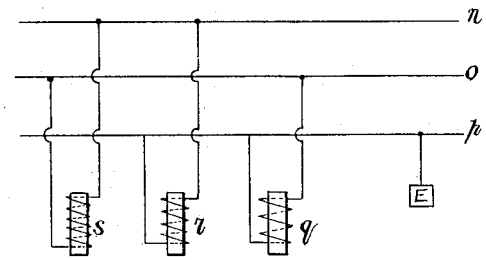

UNITED STATES PATENT OFFICE.

WILLIAM MORRIS MORDEY, OF WESTMINSTER, ENGLAND.

ALTERNATE-CURRENT TRANSMISSION.

SPECIFICATION forming part of Letters Patent No. 686,416, dated November 12, 1901.

Application filed March 16, 1900. Serial No. 8,981. (No model.)

*To all whom it may concern:*

Be it known that I, WILLIAM MORRIS MORDEY, a subject of the Queen of Great Britain and Ireland, residing at the city of Westminster, England, have invented Improvements in or Relating to Alternate-Current Transmission, of which the following is a specification.

This invention has for its object to overcome or lessen certain difficulties experienced from electrostatic capacity in power-transmission systems working with alternate currents, and especially with underground insulated cables. One of the chief of these difficulties is in connection with the generating plant, which has to produce considerable current for the electrostatic charging of the main, thus causing considerable loss by reducing the "plant efficiency" of the generating station. This wattless current, although not directly requiring much power for its production, involves the use of larger machinery than would otherwise be required, and is thus a cause of considerable expense and loss. One object of this invention is to remove this difficulty by enabling this wattless current to be produced without increase of the size of the generating plant.

Another object of this invention, and one attained by the same means as the foregoing, is to prevent or greatly lessen the danger of rupture of the insulation of cables having considerable capacity, which occurs at times of sudden changes of load or of conditions—
as, for example, when cables are switched on or off with or without load and when excessive currents are momentarily caused to traverse the cables, as when an accidental short-circuit occurs, or when such currents are stopped—as, for example, by the melting of overloaded fuses. This invention is designed to obviate in a simple manner these and other difficulties arising from the effect of capacity or to so reduce them that they cease to be seriously objectionable. For these purposes there is employed according to this invention, in conjunction with power transmission or distributing mains, one of which may be earthed or at earth's potential, a choking-coil or self-induction coil or a combined set of such coils, (hereinafter called a "choking-coil,") so designed and proportioned that when placed in parallel with the said mains—*i. e.*, in parallel with the capacity—and submitted to the same alternating electromotive force it will take a wattless self-induction current opposite in phase to and as nearly as may be equal in amount to the wattless capacity or charging current of the mains. An important economy is thus secured, as with this arrangement the electric generator has not to produce any wattless charging or capacity current for the mains, however great the capacity may be; neither has it to produce the wattless self-induction current for the choking-coil. The generator merely keeps up the pressure, working with a power factor of unity and sending out (so far as the capacity and self-induction effects of the main are concerned) only the energy-current for the choking-coil (which by suitable designing may be reduced to insignificant proportions) and any energy-current required to supply the loss caused by leakage and by dielectric electrical hysteresis in the mains and the loss in the conductor due to the actual current, usually a small amount. The idle or wattless current (alternately a capacity or charging current with a positive phase displacement and a self-induction current with a negative phase displacement) passes to and fro between the mains and the choking-coil at each reversal of the electromotive force and has not to be produced by the generator at all.

A further object of this invention attained by the same means is to provide a path or paths for the harmless discharge of currents or the relief of high pressures, which otherwise may be productive of serious consequences—as, for instance, in the case of violent rises of pressure from such causes as those above referred to. In such cases the choking-coil has a double effect—it tends to reduce or to limit the occurrence of excessive pressures and it acts as a relief valve or outlet, and so prevents breakdown of insulation or sparking between mains or to earth.

The choking-coil for the purposes of this invention may be constructed in various forms.

In the accompanying illustrative drawings, Figures 1, 2, 3, and 7 are diagrams showing electric mains with various arrangements of choking-coils according to this invention. Figs. 4 and 6 show in section and somewhat diagrammatically two different constructions of choking-coils. Fig. 5 shows partly in end elevation and partly in cross-section, and Fig. 5ª in plan, a choking-coil with means for adjusting the air-gaps between parts of the core.

In the arrangements shown in Figs. 1 and 2 a choking-coil $b$ is placed across the mains $a\ a'$, preferably at a central position of the system of mains, this coil being of such a size and design as to comply as nearly as may be with the above-stated requirement of taking a wattless self-induction current equal to the capacity-current of the said mains, or instead of one coil several smaller coils may be used, combined to form one in effect, as shown in Fig. 3. Such choking-coils should be placed on the line side of and not on the generator side of any fuses or switches or cut-outs $d$, so that in the event of the circuit being opened by a fuse, cut-out, or switch the choking-coil shall be left connected to the line. The choking-coil is made with the lowest practicable resistance and to take a very small amount of energy to magnetize it—that is to say, the wattless current it takes should be as large as practicable in relation to the energy-current. It consists of one or more helices or coils of copper with a laminated iron core having air-gaps that preferably are variable in width for purposes of adjustment, so as to make it suitable to each case and to provide compensation for variations of capacity, which often occur with cables. Figs. 4, 5, 5ª, and 6 show somewhat diagrammatically three convenient forms of such adjustable choking-coils with iron cores. In each case $g\ h$ are laminated masses built up, for example, of sheet-iron stampings, $i$ being the coils of insulated copper wire shown in section. At $k\ k$ are air-gaps in the magnetic circuit. These gaps are conveniently made adjustable in size to enable the strength of the wattless current supplied or taken by the coil to be regulated to a certain extent—as, for example, by means of the adjusting screws and nuts $l\ m$. (Shown in Figs. 5 and 5ª, respectively.) Where adjustment is not required, the parts $l\ m$ may be omitted.

In applying this invention to multiple cables as used, for example, for multiphase work where different effects of capacity usually exist between different conductors or between the separate conductors and earth one or more choking-coils is or are arranged to compensate each conductor separately. For example, if $n$, $o$, and $p$, Fig. 7, are three conductors of a triple main it may be a triple concentric or other kind of combined cable, or it may be three separate cables (usually one of them will be earthed, as, for example, at E) having different capacities between them. Then three choking-coils $q$, $r$, and $s$ may be used, constructed, respectively, to balance the capacity $o$ to $p$ or earth, $n$ to $p$ or earth, and $n$ to $o$.

I am aware it has been proposed to use self-induction devices having a high resistance with telegraphic and other cables conveying varying electric impulses for the purpose of counteracting the effects of static induction in the cables; but such arrangements, which I do not claim and which differ essentially from mine, deal with quite different conditions, have different objects from the present invention, and are unsuitable for the transmission or distribution of electric energy in bulk by alternate currents.

What I claim is—

1. The combination with a distributing system of alternate-current mains or conductors for the transmission of electric energy and one or more alternate-current generators of light or power currents, of a single choking-coil or group of choking-coils arranged in parallel with said mains or conductors at one part thereof and adapted to take a wattless self-induction current opposite in phase to and as nearly as may be equal in amount to the wattless capacity or charging current of the mains or conductors, substantially as described for the purpose specified.

2. In an alternate-current system for the distribution of electrical energy for light and power purposes, the combination with the connected system or network of mains and one or more alternate-current generators, of a choking-coil or group of choking-coils of low resistance placed at a central position in the system of mains and in parallel with and common to all the mains, the said choking-coil or group of choking-coils being adapted to balance the capacity of the whole of the connected system or network of mains and to take a wattless self-induction current opposite in phase to and as nearly as may be equal in amount to the wattless capacity or charging current of the said mains, substantially as described for the purpose specified.

3. In an alternate-current system for the distribution of electrical energy for light and power purposes by means of multiple conductors, the combination with the multiple conductors and one or more alternate-current generators connected to said conductors, of choking-coils of low resistance arranged in parallel with said conductors at one part thereof and constructed to take a wattless self-induction current opposite in phase to and as nearly as may be equal in amount to the wattless capacity or charging current of the conductors and arranged to separately compensate the individual conductors, substantially as described.

4. In an alternate-current system for the distribution of electrical energy for light and power purposes, the combination with the connected system of mains and one or more alternate-current generators, of an adjustable choking-coil or group of choking-coils arranged at one part of the system of mains and in parallel with and common to all the mains, made with a low resistance, and capable of ready adjustment to balance varying capacity of the whole connected system of network of mains, substantially as described.

5. In an alternate-current system for the distribution of electrical energy for light and power purposes, the combination with the connected system of mains and one or more alternate-current generators, of a choking-coil or group of choking-coils of low resistance arranged at a central position in the system of mains and in parallel with and common to all the mains, said coil or coils having an adjustable air gap or gaps, substantially as described for the purpose specified.

6. The combination of alternate-current mains, a cut-off, and a choking-coil across the main on the line side of said cut-off.

Signed at 77 Cornhill, London, E. C., this 2d day of March, 1900.

WILLIAM MORRIS MORDEY.

Witnesses:
  PERCY E. MATTOCKS,
  WM. O. BROWN.